May 20, 1969  G. P. KLOVEN  3,445,166
FLUID-OPERATED SHUTTER
Filed March 14, 1966  Sheet 1 of 2

INVENTOR.
GERALD P. KLOVEN
BY
Carpenter, Kinney & Coulter
ATTORNEYS

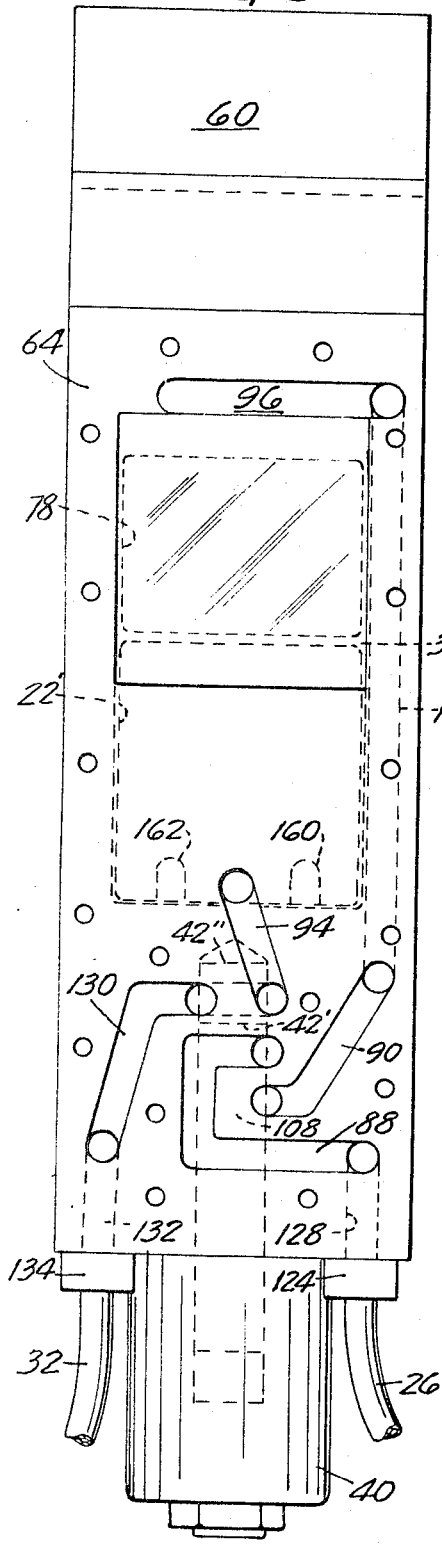
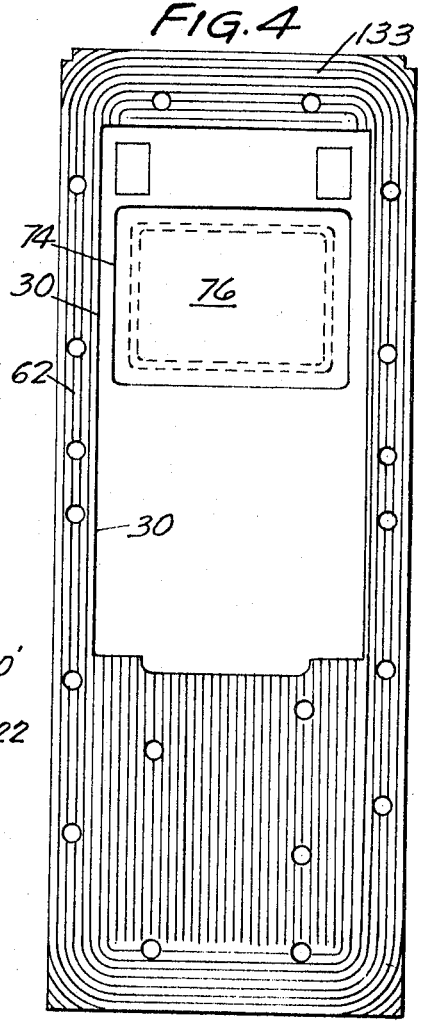
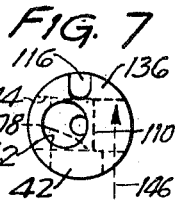
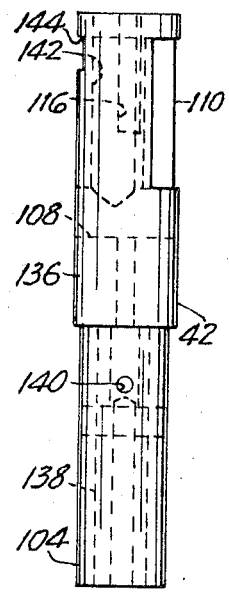
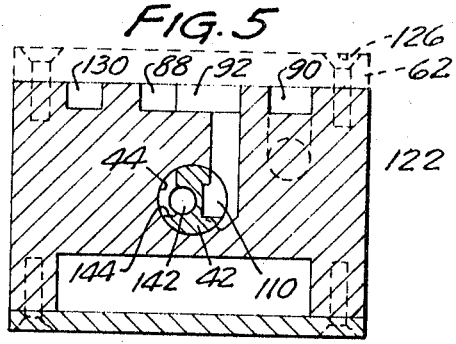

United States Patent Office 3,445,166
Patented May 20, 1969

3,445,166
FLUID-OPERATED SHUTTER
Gerald P. Kloven, White Bear Lake, Minn., assignor to Minnesota Mining and Manufacturing Company, St. Paul, Minn., a corporation of Delaware
Filed Mar. 14, 1966, Ser. No. 533,946
Int. Cl. G03b 27/04, 27/76
U.S. Cl. 355—121                 17 Claims

ABSTRACT OF THE DISCLOSURE

A fluid-operated shutter is shown which uses a transparent fluid coolant to control the operation of the shutter which is positioned between a high temperature radiation source and a radiation sensitive material wherein the transparent fluid absorbs a substantial amount of heat generated by the radiation source and effectively diminishes the amount of heat transmitted to the radiation sensitive material. The fluid-operated shutter comprises, in combination, means for controlling direction of coolant flow and a coolant flow-through chamber having windows which are substantially transparent to the radiation and which are located relative to the chamber such that when the shutter is positioned by coolant flow direction away from the windows, radiation from the source passes through the windows and impinges on the radiation sensitive material. In one embodiment, the fluid-operated shutter may include a heat exchanger for removing heat absorbed by the coolant and means for maintaining the radiation source at a substantially predetermined temperature level.

---

This invention relates to a fluid-operated shutter and in one aspect to apparatus having a high-speed liquid-operated shutter in combination with a high-temperature high-intensity light source for selectively subjecting a light sensitive material to actinic rays.

High-power film projectors and the like have employed a high-intensity light source. The lens and other parts of the optical system have been cooled by a heat absorption filter placed between the light source and the lens. Further, a fluid coolant has been circulated in the vicinity of the filter and lens.

In other projectors, a fluid coolant has been used to cool the metal parts of a film gate, pressure pad and film guides to prevent heat damaging of a film. Alternatively, a film has been placed within the fluid coolant between two transparent members thereby providing sufficient cooling of the film to prevent heat damage. In one projector a mechanical shutter, which periodically interrupted the light being directed onto a moving film, has been disposed between the light source and the metal parts engulfed by the fluid coolant. The shutter, when interrupting the light, absorbed radiant energy thereby lessening the cooling requirements of the liquid coolant.

The disadvantage of each of the above devices is that only selected components thereof spaced between the light source and film are cooled by the fluid coolant. Further, the film must be spaced from the light source to accommodate the filters, mechanical shutter and the like. When a mechanical shutter is employed, the shutter absorbs radiant energy from the light source and the resulting heat must be dissipated by means other than the fluid coolant. Thus, a disadvantage of such an arrangement is that the liquid coolant does not effectively absorb and dissipate the heat produced by the light source.

The fluid-operated shutter of the present invention overcomes the above-described disadvantages of the prior art devices. The fluid coolant is directed through a chamber having two transparent members. Further, a movable shutter is suspended within the fluid coolant. The fluid coolant effectively absorbs heat between the light source and an exposing zone thereby cooling all components located between the light source and film. The position of the shutter is determined by the direction of movement of the fluid coolant. The combination of an extremely thin shutter and a thin layer of transparent fluid coolant in a chamber permits a film to be placed as closely as possible to the light source. The film is exposed to the high-intensity light source by a shutter which is selectively moved between a light interrupting position and a light transmitting position by selectively changing the direction of movement of the coolant.

In certain image-making applications, a high-temperature high-intensity light source is required. One example of such an application is in exposing a light sensitive media to light directed through an original negative to duplicate the image on the original. The original negative is positioned in a stacked relationship with the light sensitive media. The light sensitive media-negative stack is positioned in an exposing zone with the original negative adjacent the light source. Actinic rays from the high-intensity light source are directed, for a predetermined period of time, upon the stack causing an image of the original negative to be imparted to the light sensitive media.

Often it is desirable to keep the light source energized. Thus, in the image-making application, it is necessary to utilize a shutter for exposing the stacked negative and light sensitive media to the action of actinic rays for a predetermined time period or exposure time. By controlling the direction of movement of the coolant, the shutter can quickly and positively be moved between a light interrupting position and a light transmitting position to selectively control exposure times.

Thus, one feature of the present invention is that a transparent fluid coolant maintains the ambient temperature in the vicinity of the exposure zone or film plane at a substantially lower level than the ambient temperature of the light source.

Another feature of the present invention is that the shutter is suspended in and operated by the transparent fluid coolant.

Yet another feature of the present invention is that the heated transparent fluid coolant is directed in a predetermined direction through a heat exchanger and the direction of movement of the coolant through an exposure chamber is selectively changed to position the shutter in either a light interrupting position or a light transmitting position.

Yet another feature of this invention is that the fluid coolant is contained within a chamber between two transparent members in a spaced relationship from the light source such that when the coolant is directed in one direction through the chamber the shutter is positioned between the transparent members in a light interrupting position and when the coolant is directed through the chamber in a second direction opposite to the first direction the shutter is positioned in a light transmitting position.

Another feature of the present invention is that the transparent fluid coolant flowing through the chamber absorbs an amount of heat which is sufficient to produce a temperature at the exposing zone which is substantially less than the temperature of the light source to prevent a deleterious effect on a film positioned closely adjacent the exposing zone.

These and other features and advantages of the fluid-operated shutter of the present invention will be fully understood from the following detailed description which refers to the accompanying drawing wherein:

FIGURE 3 is a front elevational view of the apparatus of FIGURE 2 with the apparatus front cover removed;

FIGURE 4 is a vertical front elevational view of the interior of the front cover of FIGURE 2;

FIGURE 5 is a transverse sectional view of FIGURE 2 taken along line 5—5;

FIGURE 6 is an elevation view of a spool valve employed in the subassembly illustrated in FIGURE 5;

FIGURE 7 is a top plan view of the spool valve of FIGURE 6;

Briefly, the fluid-operated shutter is used in combination with a high-temperature high-intensity light source. Means including first and second spaced transparent members define a chamber. The chamber is positioned in a spaced relationship from the light source with the transparent members in alignment with the light source. A transparent fluid coolant is directed through the chamber between the transparent members. Means coupled to the chamber direct the transparent fluid coolant through the chamber. A shutter, disposed in the chamber, is suspended in the fluid coolant. The shutter is held in a light interrupting position between the transparent members when the fluid coolant is moved through the chamber in a first direction. The shutter is moved into a light transmitting position when the direction of movement of the fluid coolant is in a second direction, the second direction being opposite to the first direction. Means are provided for changing the direction of movement of the fluid coolant.

Figure 1:
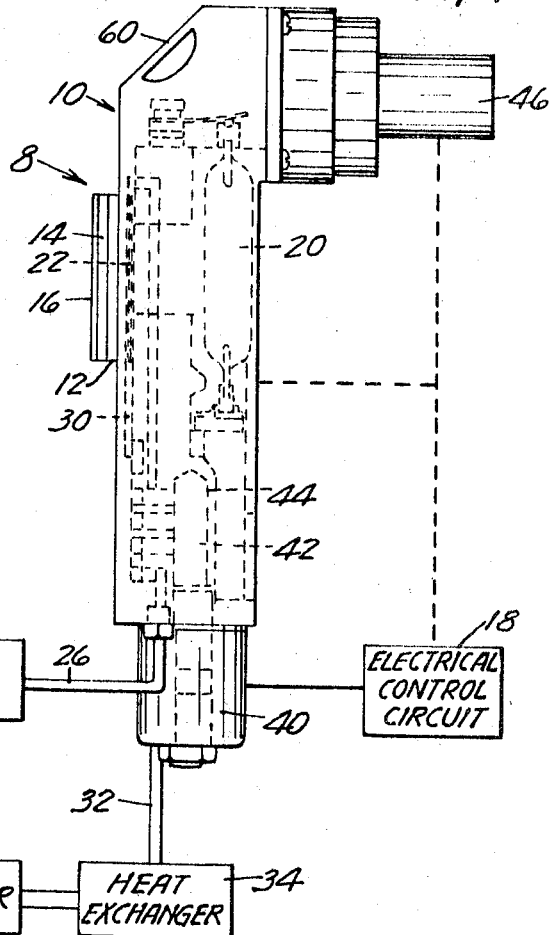
FIGURE 1 is a diagrammatic view, partially in block form, illustrating a film copying apparatus which includes a subassembly utilizing a fluid-operated shutter.

Considering FIGURE 1, a high speed exposing subassembly 8 of a film copying apparatus is illustrated. The copying apparatus would include suitable transport means for the original film strip or film chips and the sensitized unexposed film to carry the same to a position registering the original with the sensitized film and placing them in pressure contact at an exposure aperture or zone of the subassembly 8. Suitable control means for the copying apparatus would coordinate the operation of the transport means, exposing subassembly and other related mechanisms. The subassembly 8 includes a housing 10 for a fluid-operated shutter and light source, hereinafter described. A thin quartz platen 12 is supported by the housing 10 and defines the exposing zone. An original negative 14, which may be a developed 35 mm. film chip, and a light sensitive media or film chip 16 are registered with each other and with the original placed against the platen 12 to impart an image of the original 14 onto the sensitized media 16. The light sensitive media may be a film, for example a 35 mm. diazo film, or light sensitized paper. Exposure of the light sensitive media is under control of an electrical control circuit 18. The circuit 18, at the beginning of an exposure cycle, causes a lamp illustrated as dashed line 20, to increase its illumination from a low-intensity level to a high-intensity level. Concurrently, a fluid-operated shutter, illustrated as dashed line 22, is operated to subject the light sensitive media to the action of actinic rays from the lamp 20.

A pump 24 directs a transparent fluid coolant via line 26 into the housing 10. The housing 10 is formed with a plurality of fluid passageways or channels, to be hereinafter described, which direct the transparent fluid coolant into and through a chamber 30. The shutter 22 is suspended in the transparent fluid coolant being directed through chamber 30. The fluid coolant, as it passes through the chamber 30, absorbs heat generated by the lamp 20 when the lamp 20 is either at its low-intensity or high-intensity level. Thus, the platen 12 is kept at a substantially lower temperature level than that of the lamp 20. A line 32 conducts the heated fluid coolant out of the housing 10 to a heat exchanger 34.

The heat exchanger 34 removes the absorbed heat from the heated transparent fluid coolant. Thereafter, the transparent fluid coolant is directed into a reservoir 38 from which it is pumped by the pump 24 as described. A solenoid 40 is mechanically coupled to a spool valve 42, seated within a valve opening 44, in housing 10. The spool valve 42 controls the direction of movement of the fluid coolant through chamber 30. The solenoid 40, when energized by the electrical control circuit 18, moves the spool valve 42 from a normal position, directing the fluid coolant in a first direction to hold shutter 22 in a light interrupting position, into a downward position, directing the fluid coolant in a second direction moving the shutter 22 into a light transmitting position. The pump 24 directs the transparent fluid coolant into the housing 10 in a fixed direction via line 26 and line 32 carries the heated transparent fluid coolant out of the housing 10 to the heat exchanger 34 with spool valve 42 in either its normal or downward position. If the spool valve 42 is in its normal position, the fluid coolant is directed through the chamber 30 from bottom to top and movement of spool valve 42 to the downward position abruptly changes the movement of the fluid coolant through the chamber 30 from top to bottom abruptly moving shutter 22 into its light transmitting position.

When the control circuit 18 causes shutter 22 to move to its light transmitting position, the intensity of lamp 20 is increased to its high-intensity level causing light energy therefrom to pass through the chamber 30 and expose the light sensitive media 16. At the end of an exposing cycle, the electrical control circuit 18 de-energizes solenoid 40 and spool valve 42 is moved back to its normal position. When the spool valve 42 returns to its normal position, the direction of movement of the fluid coolant through chamber 30 is changed back to its first direction thereby moving shutter 22 into its light interrupting position. Concurrently, the electrical control circuit 18 causes lamp 20 to decrease its illumination from its high-intensity level back to its low-intensity level. The fluid coolant passing through chamber 30 absorbs heat from within the vicinity of the exposing zone and platen 12.

A lamp blower 46, coupled to the back of housing 10, circulates a second fluid coolant in the vicinity of lamp 20, which coolant is discharged through an opening 48 located on the back of the housing 10.

Figure 2:
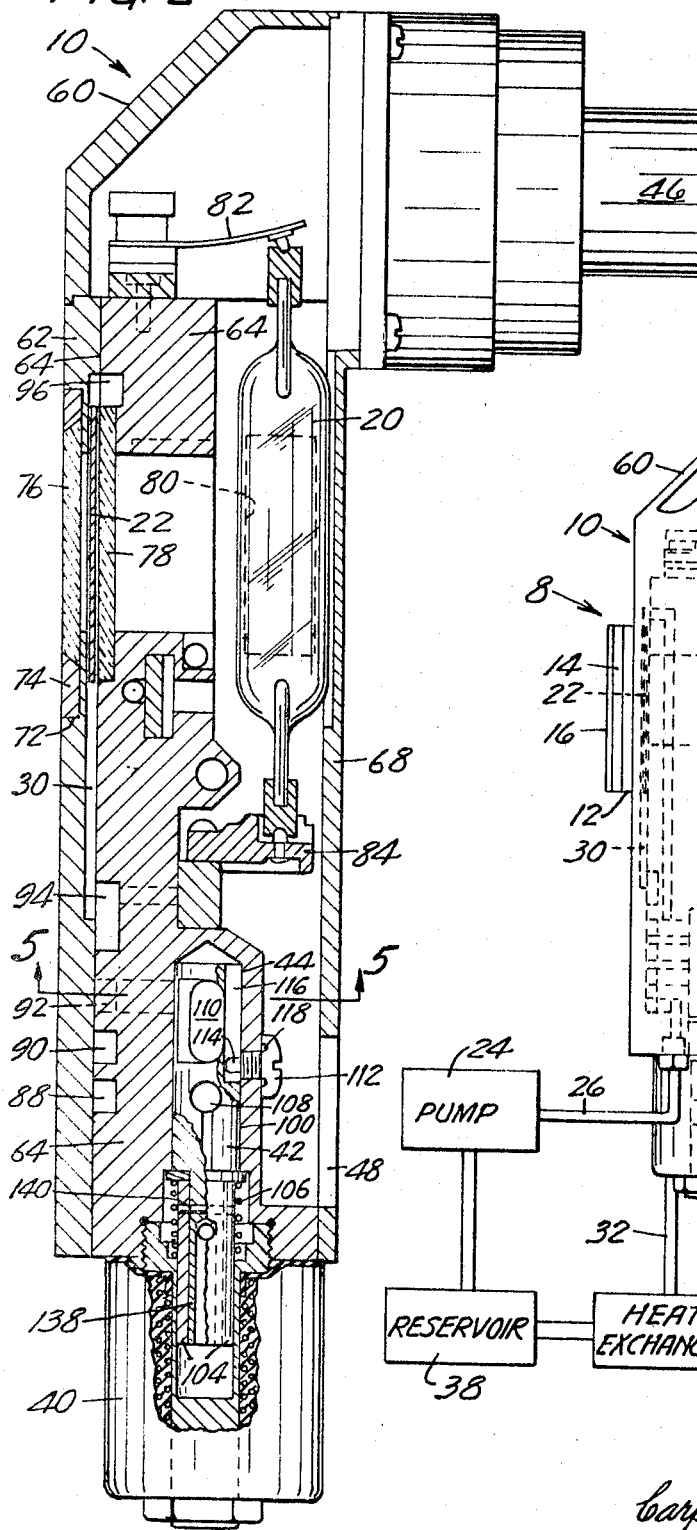
FIGURE 2 is a vertical sectional view taken through the apparatus of FIGURE 1 illustrating the fluid-operated shutter.

The vertical cross-section of FIGURE 2 illustrates the structural relationship of the housing 10 in greater detail and like numbers identify like parts throughout the several views.

A removable top 60 is located on the upper end of the housing 10 to facilitate easy replacement of lamp 20. A front cover 62 is fastened to a main frame 64 through a yieldable fluid-tight seal 66. A back cover 68, having an opening 48 therein, is fixedly connected to the main frame 64.

The chamber 30 is formed by a recess or hollowed-out portion of front cover 62. Front cover 62 includes a window area 72. Window area 72 has a glass housing 74 therein, which glass housing 74 supports a first transparent plate of heat absorbing glass 76. The quartz platen 12 (illustrated in FIGURE 1) is disposed adjacent the outside surface of the heat absorbing glass 76. The heat absorbing glass 76 is sealed fluid tight within glass housing 74. Similarly, the glass housing 74 is sealed fluid tight in the window area 72 of the front cover 62.

A second transparent plate of quartz 78 is mounted flush with the front surface of main frame 64 and forms part of the other side of chamber 30. The quartz 78 is sealed within the main frame 64 thereby insuring that the entire chamber 30 is fluid tight. The heat absorbing glass 76 and the quartz 78 are spaced from each other and in alignment with the lamp 20. Further, the main frame 64 includes a light reflector 80 and removable support electrodes 82 and 84 for supporting the lamp 20.

The fluid coolant is circulated within the main frame 64 through a plurality of channels. The channels visible in the section of FIGURE 2 are designated 88 through 96. A preferred fluid coolant used in practicing this invention is a liquid fluorocarbon, such as perfluoroalkylated tertiary amine boiling at about 180° C. The remainder of the description will refer to the fluid as a liquid coolant, which is pumped by pump 24 through the channels in housing 10 under a pressure of about 30 pounds per square inch (about 2 kilograms per square centimeter).

The solenoid 40 has a plunger 104 fixedly connected to the movable spool valve 42, which valve 42 moves between a normal position and a downward position within valve opening 44. The movable spool valve 42 is retained in its normal position by a spring 106 when solenoid 40 is de-energized. The spool valve 42 has an opening 108 and a diverting port 110 therein for selectively directing the liquid coolant from the pump 24, selectively through certain of the channels. When the spool valve 42 is in its normal position as illustrated, an opening 108 and port 110 therein cooperate to direct the liquid coolant through the channels such that the coolant enters chamber 30 through a lower channel 94 communicating with chamber 30 and leaves chamber 30 via an upper channel 96.

When the solenoid 40 is energized by electrical control circuit 18 during an exposure cycle, plunger 104 is moved in a downward direction moving spool valve 42 against spring 106. Spool valve 42 is retained in a downward position compressing spring 106 until solenoid 40 is de-energized at the end of the exposure cycle. When spool valve 42 is in its downward position, port 110 directs the liquid coolant through certain of the channels 88 through 96. The liquid coolant enters the chamber 30 through channel 96 and leaves chamber 30 via channel 94. Movement of the liquid coolant from top to bottom through chamber 30 moves shutter 22 from its light interrupting position, between the heat absorbing glass 76 and quartz 78, into a light transmitting position therebelow substantially between front cover 62 and the main frame 64.

While shutter 22 is in its light transmitting position, the liquid coolant continually flows through chamber 30 between heat absorbing glass 76 and quartz 78. Light from the lamp 20 is transmitted through quartz 78, the transparent liquid coolant and the heat absorbing glass 76. Thus, it is an important requirement of this invention that the coolant be substantially transparent so as not to significantly absorb or attenuate the light passing therethrough.

When solenoid 40 is de-energized the shutter 22 is to be returned to its light interrupting position. The compressed spring 106 abruptly urges spool valve 42 back into its normal position. Movement of spool valve 42 into its normal position changes the direction of movement of the liquid coolant through the chamber 30 from the second direction back to the first direction.

The spool valve 42 is prevented from rotating as it moves between its normal position and its downward position by a threaded guide member 112 which is turned into a threaded bore within main frame 64. The guide member 112 has a key 114 which slideably engages a slot 116 in spool valve 42. An O-ring seal 118 located between the threaded guide member 112 and the main frame 64 insures a fluid-tight seal therebetween.

In this embodiment, a spool valve 42 is employed as the means for changing direction of the coolant. However, it is anticipated that the direction of movement of the liquid coolant could be changed directly by a reversible pump and proper valving in place of pump 24.

The lamp 20 is located in a second chamber in housing 10 adjacent chamber 30. Lamp 20 may be a G.E. mercury lamp designated as No. H2T5½. However, lamp 20 is preferably operated at a substantially higher power than normal when in its high-intensity level to afford a high-intensity light source for a brief exposure period. The envelope temperature of lamp 20 can, under normal operating conditions, exceed 1500° F. (approximately 815° C.). The lamp blower 46 directs a flow of cooling fluid such as air through housing 10 maintaining lamp 20 at the desired ambient temperature. The heated air column is discharged through opening 48 in the back cover 68.

The quartz 78 is disposed adjacent the chamber 30 such that the quartz surface in contact with the liquid coolant is at substantially the same temperature as the liquid coolant. However, the temperature on the other side of the quartz 78 is significantly higher than the liquid coolant due to the proximity of the quartz 78 relative to the lamp 20. Thus, the liquid coolant flowing through chamber 30 conducts heat absorbed by the quartz 78, the heat absorbing glass 76 and the frame 64 such that the exposing zone temperature is at about 150° F. (about 65° C.).

FIGURE 3 illustrates the channels 88 through 96 in greater detail. Certain of the channels are located on the front surface of main frame 64 and in registry with the front cover 62. A channel 90 is connected to channel 96 through a channel 122. The main frame 64 illustrates, by dashed line 30', the outline of chamber 30. Quartz 78 is mounted such that its outer surface is flush with the surface of main frame 64. Additionally, the light transmitting position of shutter 22 is illustrated by dashed line 22'. When the shutter 22 is in the position illustrated by dashed line 22', spool valve 42 is in its downward position as illustrated by dashed line 42'.

Liquid coolant from pump 24 is received through line 26, which line 26 is fixedly connected to main frame 64 via a coupling 124. A channel 128, having a 90° turn therein, is connected to line 26 and joins channel 88 at the front surface of main frame 64. Channel 88, as illustrated, traverses the front surface of main frame 64 whereupon it forms a U-shaped channel terminating as channel 92. Channel 92 passes into the frame 64 and communicates with the valve opening 44. Channel 90 is substantially L-shaped and appears on the front surface of frame 64. One end of channel 90 communicates with the valve opening 44 while its other end passes into frame 64 and communicates with the channel 122, which extends vertically through frame 64. Channel 122 passes from within frame 64 out to the front surface thereof and communicates with channel 96.

At the lower side of chamber 30, channel 94 also located on the surface of frame 64 communicates with chamber 30 and the upper portion of the valve opening 44.

Another L-shaped channel 130 is formed on the front surface of frame 64. One end of channel 130 passes into frame 64 and into the valve opening 44. The other end of channel 130 passes into frame 64 to intersect a channel 132 formed within frame 64. Channel 132 connects to line 32 via a coupling 134.

The pump 24 directs the liquid coolant in a fixed direction through line 26 and channels 128, 88 and 92. When the spool valve 42 is in its downward position, as illustrated by dashed line 42', the port 110 of spool valve 42 deflects the liquid coolant into channel 90. The liquid coolant is conducted by channels 90, 122 and 96 into chamber 30 outlined by dashed line 30'. The liquid coolant passes through chamber 30 and leaves by channel 94. The flow of liquid coolant through chamber 30 forceably urges the shutter 22 into the position illustrated by dashed line 22' within chamber 30. Channel 94 conducts the liquid coolant to the valve opening 44 whereupon the top surface of spool valve 42 deflects the heated liquid coolant into channel 130. The heated liquid coolant is conducted by channels 130 and 132 to the heat exchanger 34. The flow of liquid coolant in channels 130 and 132 and line 32 is always in a fixed direction.

When the spool valve 42 is returned to its normal position, illustrated by dashed line 42'', the direction of movement of the coolant is changed in certain of the channels. The coolant within channel 92 is deflected by port 110 into channel 94. The coolant flows from channel 94 through chamber 30 into channel 96. The flow of coolant through the chamber in this direction forceably urges shutter 22 from its light transmitting position, illustrated by dashed line 22', into its light interrupting position in front of quartz 78.

The liquid coolant is carried by channels 96, 122 and 90 back to the valve opening 44. Since the spool valve 42 is in its normal position, as illustrated by dashed line 42", the coolant passes through opening 108, illustrated by dashed line 108', and upward through an axially extending passage or opening 142 in the spool valve 42, out channels 130 and 132 to line 32 whereupon the heated liquid coolant is returned to the heat exchanger 34.

FIGURE 4 illustrates the front cover 62 which is secured to the front of main frame 64. The front cover 62 has the chamber 30 formed therein. In this embodiment, the front cover 62 is connected to frame 64 by means of fasteners such as, for example, screws 126 (illustrated in FIGURE 5) and a suitable sealant or gasket. A yieldable serrated gasket formed by applying a sealant to the cover using a rolling mill knurl or by drawing a threaded rod over a sealing adhesive forming a pattern, as indicated at 133, in the sealant before mounting the cover to the frame assures a yieldable fluid-tight seal. cover to the frame assures a yieldable fluidtight seal. The preferred sealant is a Dow-Corning Silastic, sold under the trademark LAB RTV, which is curable at room temperature.

FIGURE 5 illustrates in a sectional view the structural relationship between channels 130, 88, 92, 90 and 122. The front cover 62 and screws 126 are illustrated in a dashed outline. Channel 92 communicates with the valve opening 44 such that the liquid coolant is directed into the port 110 of spool valve 42 and diverted in an appropriate direction toward channel 90 or 94.

FIGURE 6 illustrates in a front view the spool valve 42 and FIGURE 7 illustrates a top end view of the spool valve 42. The spool valve 42 has a piston member 136 and a shank member 138. Shank member 138 has a hole 140 therethrough. Shank member 138 is disposed within a bored aperture of plunger 104 and is fixedly connected thereto by means of a connecting pin (not shown) passed through hole 140.

The piston member 136 has the radial opening 108 and port 110 illustrated therein. The opening 142 extends in an axial direction through the piston member 136 to communicate with opening 108 and communicates with a notched portion 144 in the side wall of piston member 136. As discussed in relation with FIGURE 2, when the spool valve 42 is in its downward position, opening 108 and opening 142 cooperate to carry the liquid coolant to channel 130.

Referring now to FIGURE 7, the opening 108, port 110 and notched portion 144 are each illustrated by dashed lines. Slot 116 is disposed in the side wall of piston member 136 and extends in an axial direction from the top of piston member 136 to about the level where opening 108 passes through piston member 136. In FIGURE 7, port 110 is used to deflect the liquid coolant in either one of two directions depending on the position of the spool valve 42 within valve opening 44. Channel 92 (illustrated in FIGURE 2) continually directs the liquid coolant into the port 110 as illustrated by dashed arrow 146. Port 110 diverts the liquid coolant either in a downward or upward direction into either channel 90 or 94, respectively (illustrated in FIGURE 3).

Figure 8:
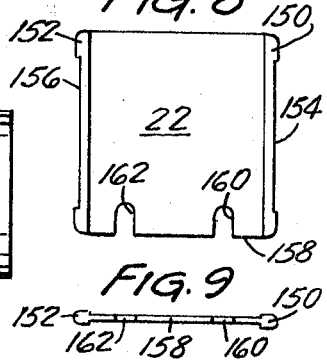
FIGURE 8 is an elevational view of a shutter.

FIGURE 8 illustrates in detail the shutter 22. Each edge of the shutter 22 supports rails 150 and 152 which extend in a longitudinal direction or in the direction of movement of the liquid coolant. Each rail 150 and 152 have notched-out portions illustrated as 154 and 156, respectively. Intermediate the rails is a blade portion 158. The blade portion 158 has two notches along the bottom edge designated by numerals 160 and 162. The shutter material is aluminum type 2024–T3.

The shutter 22 has a front surface of approximately two inches by two inches (approximately 50 centimeters by 50 centimeters).

Figure 9:
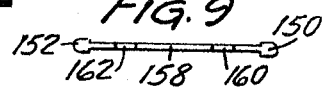
FIGURE 9 is a bottom view of the shutter of FIGURE 8.

FIGURE 9 is a bottom view of the shutter 22 illustrating the relationship between the rails 150 and 152 which support the blade portion 158 including notches 160 and 162.

The thickness of the rails 150 and 152 is approximately 64 thousandths of an inch (approximately 1.5 millimeters) while the thickness of the blade portion 158 is approximately 44 thousandths of an inch (approximately 1 millimeter). The depth of chamber 30 is approximately 80 thousandths of an inch (approximately 2 millimeters) with a length of approximately four inches (approximately 100 centimeters) in the longitudinal direction and with a width of approximately two inches (approximately 50 centimeters) in the traverse direction. The overall outside dimensions of housing 10 are approximately three inches by seven inches by two inches (approximately 70 centimeters by 180 centimeters by 50 centimeters).

Having thus described the present invention by reference to a device representing a preferred embodiment, it is to be understood that various modifications will be apparent to one having ordinary skill in the art and all such changes are contemplated as may come within the scope of the appended claims.

What is claimed is:
1. In combination
   (a) a high-temperature light source having variable intensity characteristics;
   (b) means including first and second spaced transparent members defining a shutter chamber, said chamber being positioned in a spaced relationship from said light source with said transparent members positioned in alignment with said light source;
   (c) a transparent fluid coolant;
   (d) means operatively coupled to said means defining a shutter chamber for directing said fluid coolant through said chamber;
   (e) a shutter disposed in said chamber and suspended in said fluid coolant, said shutter being held in a light interrupting position between said transparent members of said means defining a shutter chamber when said fluid coolant is moved through said chamber in a first direction and in a light transmitting position within said chamber when said fluid coolant is moved through said chamber in a second direction which is substantially opposite to said first direction; and
   (f) control means operatively connected to said directing means for changing the direction of movement of said fluid coolant and operatively connected to said light source for varying the intensity thereof, said control means being capable of simultaneously increasing the intensity of said light source and directing said coolant in said second direction and of simultaneously decreasing the intensity of said light source and directing said coolant in said first direction.

2. The combination of claim 1 wherein said means defining said shutter chamber includes means defining a second chamber for enclosing said light source and means forming predetermined channels operatively coupled to said directing means for conducting said fluid coolant into and away from said shutter chamber.

3. The combination of claim 1 wherein said shutter is a thin rectangular plate having a pair of spaced parallel rails extending in the direction of movement of the coolant.

4. The combination of claim 2 wherein said directing means includes (i) propelling means capable of directing said fluid coolant in a fixed direction through certain of said channels, (ii) means operatively coupled between said propelling means and said means forming predetermined channels for diverting said fluid coolant in said first direction through said shutter chamber to hold said shutter in said light interrupting position and in said second direction through said shutter chamber to move said shutter from said light interrupting position into said light transmitting position.

5. In combination
(a) a high-temperature light source;
(b) means including first and second spaced transparent members defining a shutter chamber, said shutter chamber being positioned in a spaced relationship from said light source with said transparent members positioned in alignment with said light source and further including means defining a second chamber for enclosing said light source and means forming predetermined channels;
(c) a transparent fluid coolant;
(d) means operatively coupled to said means defining a shutter chamber for directing said fluid coolant through said shutter chamber and operatively coupled to said means forming predetermined channels for conducting said fluid coolant into and away from said shutter chamber, said directing means including
    (i) propelling means capable of directing said fluid coolant in a fixed direction through certain of said channels, and
    (ii) means operatively coupled between said propelling means and said means forming predetermined channels for diverting said fluid coolant in a first direction through said shutter chamber and in a second direction through said shutter chamber which is subsantially opposite to said first direction;
(e) a shutter disposed in said chamber and suspended in said fluid coolant, said shutter being held in a light interrupting position between said transparent members of said means defining said shutter chamber when said fluid coolant is moved through said chamber in said first direction and in a light transmitting position within said chamber when said fluid coolant is moved through said chamber in said second direction;
(f) means for changing the direction of movement of said fluid coolant; and
(g) a heat exchanger and coupling means connected to said directing means for removing heat absorbed by said fluid coolant.

6. The combination of claim 4 wherein said fluid coolant is a liquid fluorocarbon.

7. The combination of claim 5, further comprising,
(h) means coupled to said second chamber for maintaining the temperature of said high-temperature light source at a substantially predetermined level.

8. A high speed liquid-operated shutter for use with a high-temperature high-intensity light source comprising
(a) a transparent liquid coolant;
(b) a housing having first and second hollowed-out chambers, said first chamber enclosing said light source and being in a spaced relationship from said second chamber, said housing including means forming predetermined channels for directing said liquid coolant into and away from said second chamber;
(c) a first rigid liquid-tight transparent member spaced from and in alignment with said light source and defining one side of said second chamber;
(d) a second rigid liquid-tight transparent member located between and in spaced alignment with said first transparent member and said light source and defining the other side of said second chamber;

(e) a plate-like shutter disposed in said second chamber and suspended in said liquid coolant, said shutter being held in a light interrupting position between said first and second transparent members when said liquid coolant is moved through said second chamber in a first direction and in a light transmitting position when said coolant is moved through said second chamber in a second direction which is substantially opposite to said first direction;
(f) a pump operatively coupled to said housing for directing liquid coolant in a fixed direction through certain of said channels;
(g) a spool valve disposed within said housing and in registry with certain of said channels, said spool valve having a first position for diverting said liquid coolant through certain of said channels and said second chamber in a first direction to hold said shutter in said light interrupting position, said spool valve having a second position for diverting said liquid coolant through certain of the channels and said second chamber in a second direction which is substantially opposite to said first direction to move said shutter into said light transmitting position;
(h) a solenoid connected to said spool valve to move said spool valve from its first position to its second position when said solenoid is energized; and
(i) circuit means electrically connected to said solenoid for selectively energizing said solenoid.

9. The liquid-operated shutter of claim 8 wherein said shutter includes raised rails along the edges of said plate-like shutter which edges extend in the direction of movement of the coolant.

10. The liquid-operated shutter of claim 8, further comprising,
(j) a heat exchanger operatively coupled between said housing and said pump for removing heat from said liquid coolant.

11. The liquid-operated shutter of claim 10, further comprising,
(k) fluid moving means operatively coupled to said first chamber for maintaining the temperature of said high-temperature light source at a substantially predetermined level.

12. The liquid-operated shutter of claim 11, further comprising,
(l) a reservoir connected between said pump and said heat exchanger for accumulating said cooled liquid coolant from said heat exchanger.

13. The liquid-operated shutter of claim 8 wherein said housing includes a cover for supporting said first transparent member and having a hollowed-out section forming said second chamber, said cover being secured to said housing by fasteners and a yieldable liquid-tight sealant.

14. The liquid-operated shutter of claim 13 wherein said liquid coolant is a fluorocarbon with a boiling point at about 180° C.

15. The liquid-operated shutter of claim 8 wherein said first transparent member is a heat absorbing glass and said second transparent member is quartz.

16. The liquid-operated shutter of claim 15, further comprising,
(j) a quartz platen positioned adjacent said heat absorbing glass for keeping a media placed against said platen from contacting said heat absorbing glass.

17. In combination
(a) a high-temperature radiation source having variable intensity characteristics;
(b) means including first and second spaced transparent members defining a shutter chamber, said chamber being positioned in a spaced relationship from said radiation source with said transparent members positioned in alignment with said radiation source;

(c) a transparent fluid coolant;
(d) means operatively coupled to said means defining a shutter chamber for directing said fluid coolant through said chamber;
(e) a shutter disposed in said chamber and suspended in said fluid coolant, said shutter being held in a radiation interrupting position between said transparent members of said means defining a shutter chamber when said fluid coolant is moved through said chamber in a first direction and in a radiation transmitting position within said chamber when said fluid coolant is moved through said chamber in a second direction which is substantially opposite to said first direction; and
(f) control means operatively connected to said directing means for changing the direction of movement of said fluid coolant and operatively connected to said radiation source for varying the intensity thereof, said control means being capable of simultaneously increasing the intensity of said radiation source and directing said coolant in said second direction and of simultaneously decreasing the intensity of said radiation source and directing said coolant in said first direction.

References Cited

UNITED STATES PATENTS 3,334,226  8/1967  Buck _____ 350—266

JOHN M. HORAN, *Primary Examiner.*

U.S. Cl. X.R.

95—54, 55; 350—266; 353—54, 55, 88; 355—30, 71